United States Patent
Asakura et al.

[19]

[11] Patent Number: 5,981,667
[45] Date of Patent: Nov. 9, 1999

[54] IMPACT-RESISTANT POLYSTYRENE RESIN COMPOSITION

[75] Inventors: Yoshio Asakura; Takashi Wada; Keiichi Akahori; Nobuhiro Tsujimoto; Michinori Suzuki, all of Chiba, Japan

[73] Assignee: UBE Industries, Ltd., Yamaguchi, Japan

[21] Appl. No.: 08/967,495

[22] Filed: Nov. 11, 1997

Related U.S. Application Data

[63] Continuation-in-part of application No. 08/761,697, Dec. 6, 1996.

[30] Foreign Application Priority Data

Nov. 12, 1996 [JP] Japan .................................. 8-300062
Nov. 26, 1996 [JP] Japan .................................. 8-315082
Feb. 7, 1997 [JP] Japan .................................. 9-025475

[51] Int. Cl.[6] ................................................. C08F 279/02
[52] U.S. Cl. ................. 525/316; 525/243; 526/134; 526/160; 526/170; 526/340.4
[58] Field of Search .................................. 525/232, 241, 525/243, 316; 526/340.4, 160, 170, 134

[56] References Cited

U.S. PATENT DOCUMENTS 4,579,920  4/1986  Tsujimoto et al. ...................... 526/138

FOREIGN PATENT DOCUMENTS 0778291   6/1997   European Pat. Off. .
57170909  4/1983   Japan .
09286810  1/1998   Japan .

*Primary Examiner*—Fred Teskin
*Attorney, Agent, or Firm*—Panitch Schwarze Jacobs & Nadel, P.C.

[57] ABSTRACT

Rubber-modified, impact-resistant polystyrene resin compositions having a well balanced combination of improved properties such as tensile strength and tensile elongation as well as reactivity with styrene monomers, impact resistance, low-temperature properties, and gloss, comprise dispersed particles of a rubber polymer which satisfies the following: (1) the content of the rubber polymer in the compositions is from 1 to 25% by weight; (2) the rubber polymer is a high-cis high-vinyl polybutadiene comprising from 65 to 95% cis-1,4-structures and from 30 to 4% 1,2-structures; and (3) the relationship between the 1,4-structures and 1,2-structures of the rubber polymer is represented by the following expression (A), wherein the value of $\beta$ is in the range of $1.0 < \beta \leq 1.43$;

$$\beta = P_{1,2\text{-},1\text{-}4}/(2 \times P_{1,2} \times P_{1,4}) \tag{A}$$

wherein $P_{1,2}$ represents the content of 1,2-structures, $P_{1,4}$ represents the content of 1,4-structures, and $P_{1\text{-}2,1\text{-}4}$ represents the content of 1,2-structure/1,4-structure diads in all diads. Additionally, rubber-modified, impact-resistant polystyrene resin compositions comprise dispersed particles of a rubber polymer which satisfies (1) and (2), as well as (5) the relationship represented by the following expression (C), wherein E (the tensile elongation (%)) satisfies $20\% < E < 90\%$;

$$E = -17.8X_1 + 5.6X_2 + 38.5 \tag{C}$$

wherein $X_1$ represents dispersed particle diameter and $X_2$ represents the amount of rubber polymer.

4 Claims, No Drawings

IMPACT-RESISTANT POLYSTYRENE RESIN COMPOSITION

CROSS REFERENCE TO RELATED APPLICATION

This is continuation-in-part application of Ser. No. 08/761,697 filed Dec. 6, 1996.

FIELD OF THE INVENTION

The present invention relates to rubber-modified impact-resistant polystyrene resin compositions having a well balanced combination of improved properties such as reactivity with styrene monomer, impact resistance (Izod and Du Pont), low-temperature properties, gloss, tensile strength, and tensile elongation.

BACKGROUND OF THE INVENTION

A copolymer obtained by adding a polybutadiene to styrene monomer to conduct radical polymerization is widely known as an impact-resistant polystyrene resin composition which combines the excellent properties inherent in polystyrene and improved impact resistance.

Modifier rubbers generally used for producing the impact-resistant polystyrene resin composition include a low-cis polybutadiene obtained by polymerizing 1,3-butadiene using an alkyllithium catalyst and made up of from 30 to 35% cis-1,4 structures, from 10 to 20% vinyl structures, and from 50 to 60% trans-1,4 structures (hereinafter referred to as "low-cis BR") and a high-cis polybutadiene obtained by polymerizing 1,3-butadiene using a cobalt, titanium, or nickel catalyst and made up of from 90 to 98% cis-1,4 structures, from 1 to 5% vinyl structures, and from 1 to 5% trans-1,4 structures (hereinafter referred to as "high-cis BR").

On the other hand, it has been reported that a high-cis high-vinyl BR (hereinafter referred to as "HC-HV BR") was obtained with a catalyst comprising a combination of methyl aluminoxane (hereinafter referred to as "MAO") and a titanium metallocene complex, butoxy titanate compound, or transition metal acetylacetone complex, i.e., an MAO-CpTiCl$_3$ [CpTi(OBu)$_3$, Ti(OBu)$_4$] catalyst system [see *Macromol. Symp.*, 89, 383(1995)], with an MAO-CpVCl$_2$ (Cp$_2$VCl) catalyst system [see *Polymer*, 37, 363(1996)], or with an MAO-Cr(acac)$_3$ [V(acac)$_3$, Fe(acac)$_3$] catalyst system [see *IRC-95 Kobe, Preprint*, 25C-4(1995)]. However, all these prior art catalysts have low activity, and a low polymer concentration results.

In JP-B-62-16201 is reported an impact-resistant polystyrene resin containing an HC-HV BR obtained using a cobalt catalyst in combination with a dihydric alcohol. (The term "JP-B" as used herein means an "examined Japanese patent publication".) However, this technique is unsuitable for industrial use because the HC-HV BR has low catalytic activity and the polymer concentration is low.

Furthermore, it has been reported in JP-B-56-50894 and JP-A-55-129403 that an HC-HV BR was obtained even in the presence of an organophosphorus compound. (The term "JP-A" as used herein means an "unexamined published Japanese patent application".) However, these techniques each is unsuitable for practical use because the catalytic activity is low and the polymer concentration is also low.

In JP-A-6-80855, it has been reported that a thermoplastic resin composition excellent in impact resistance and tensile elongation was obtained from a styrene/butadiene copolymer rubber, a rubber-modified styrene/methyl methacrylate graft copolymer, and a styrene/butadiene block copolymer. However, this prior art composition is not always satisfactory.

A feature of high-cis BR's resides in that although excellent in low-temperature properties because of the low glass transition temperature thereof (usually from −95 to −110° C.), they have low reactivity with styrene monomer (low grafting percentage) because of the low vinyl structure content thereof. Therefore, the impact-resistant polystyrene resin compositions obtained using high-cis BR's are unsatisfactory in the size reduction of rubber particles (gloss) and surface impact resistance (Du Pont impact resistance), although excellent in Izod impact resistance.

On the other hand, low-cis BR's have a high glass transition temperature (usually from −75 to −95° C.) and have high reactivity with styrene monomer (high grafting percentage) because of the high vinyl structure content thereof. Consequently, impact-resistant polystyrene resin compositions obtained using low-cis BR's are unsatisfactory in Izod impact strength and low-temperature properties, although excellent in the size reduction of rubber particles and in surface impact resistance.

There has recently been a strong desire for the development of a BR which can retain both the desirable properties of high-cis BR's and those of low-cis BR's when the BR is used as a modifier rubber of an impact-resistant polystyrene resin composition and which can improve properties of the impact-resistant polystyrene resin composition such as impact resistance, low-temperature properties, gloss, tensile strength, and tensile elongation in the well balance.

SUMMARY OF THE INVENTION

An object of the present invention is to provide impact-resistant polystyrene resin compositions having a well balanced combination of improved properties such as reactivity with styrene monomer, impact resistance (Izod and Du Pont), low-temperature properties, gloss, tensile strength, and tensile elongation.

The present invention provides a rubber-modified impact-resistant polystyrene resin composition containing dispersed particles comprising a rubber-like polymer, said composition satisfying the following: (1) the content of the rubber-like polymer in the composition is from 1 to 25% by weight; (2) the rubber-like polymer is a high-cis high-vinyl polybutadiene comprising from 95 to 65% cis-1,4-structures and from 30 to 4% 1,2-structures; and (3) when the relationship between the 1,4-structures and 1,2-structures of the rubber-like polymer is represented by the following expression (A), the value of β is in the range of 1.0<β≦1.43:

$$\beta = P_{1,2\text{-}1,4}/(2 \times P_{1,2} \times P_{1,4}) \tag{A}$$

wherein $P_{1,2}$ represents the content of 1,2-structures, P1,4 represents the content of 1,4-structures, and P1,2-1,4 represents the content of 1,2-structure/1,4-structure diads in all diads.

The present invention further provides the above rubber-modified impact-resistant polystyrene resin composition wherein the high-cis high-vinyl polybutadiene is a polybutadiene obtained using a catalyst system comprising: (a) a metallocene complex compound of a transition metal of Group V of the periodic table; and (b) an ionic compound comprising a non-coordinating anion and a cation and/or an aluminoxane.

This invention furthermore provides a rubber-modified impact-resistant polystyrene resin composition containing dispersed particles comprising a rubber-like polymer, said composition satisfying the following: (1) the content of the rubber-like polymer in the composition is from 1 to 25% by weight; (2) the rubber-like polymer is a high-cis high-vinyl polybutadiene comprising from 95 to 65% cis-1,4-structures and from 30 to 4% 1,2-structures; (3) when the relationship between the 1,4-structures and 1,2-structures of the rubber-like polymer is represented by the following expression (A), the value of β is in the range of 1.0<β≦1.43:

$$\beta = P_{1,2-1,4}/(2 \times P_{1,2} \times P_{1,4}) \quad (A)$$

wherein $P_{1,2}$ represents the content of 1,2-structures, $P_{1,4}$ represents the content of 1,4-structures, and $P_{1,2-1,4}$ represents the content of 1,2-structure/1,4-structure diads in all diads; and (4) the relationship between the viscosity of a 5% styrene solution of the rubber-like polymer as measurement at 25° C. (5% SV) and the Mooney viscosity ($ML_{1+4}$) of the polymer satisfies the following expression (B):

$$2.0 \leq (5\% \text{ SV})/ML_{1+4} \leq 7.0 \quad (B).$$

This invention furthermore provides a rubber-modified impact-resistant polystyrene resin composition containing dispersed particles comprising a rubber-like polymer, said composition satisfying the following: (1) the content of the rubber-like polymer in the composition is from 3 to 15% by weight; (2) the rubber-like polymer is a high-cis high-vinyl polybutadiene comprising from 65 to 95% cis-1,4-structures and from 30 to 4% 1,2-structures; and (5) when the relationship between the tensile elongation of the rubber-modified impact-resistant polystyrene resin composition and the dispersed-particle diameter and amount of the rubber-like polymer is represented by the following expression (C), the value of E is in the range of 20%<E<90%:

$$E = -17.8X_1 + 5.6X_2 + 38.5 \quad (C)$$

wherein E represents the tensile elongation (%), $X_1$ represents the dispersed-particle diameter (μm) of the rubber-like polymer, and $X_2$ represents the amount (wt %) of the rubber-like polymer.

DETAILED DESCRIPTION OF THE INVENTION

The constituent requirements of the present invention will be explained below in detail.

Requirement (1) is explained.

Requirement (1) is a rubber-like polymer, which is contained in the impact-resistant polystyrene resin compositions in an amount of from 1 to 25% by weight, preferably from 3 to 15% by weight. If the content of the rubber-like polymer is lower than 1% by weight, the effects of the present invention cannot be obtained. The impact resistance of the resin is improved with the increasing content of the rubber-like polymer. However, contents of the rubber-like polymer exceeding 25% by weight are undesirable in that it is difficult to control the diameter of rubber particles because of an increased styrene solution viscosity, so that the effects of the present invention cannot be produced and the composition has no value of industrial utilization. Since the content of the rubber-like polymer influences impact resistance, gloss, heat resistance, low-temperature properties, hardness, flowability, tensile properties, and other properties, the content thereof is preferably as low as possible. The more preferred range of the content of the rubber-like polymer is from 5 to 15% by weight.

A generally employed process for producing the impact-resistant polystyrene resin compositions comprises polymerizing styrene monomer in the presence of a rubber-like polymer. A bulk polymerization process or bulk suspension polymerization process is economically advantageous. In producing the compositions, it is possible, if desired and necessary, to use a styrene/butadiene copolymer, an ethylene/propylene copolymer, an ethylene/vinyl acetate copolymer, an acrylic rubber, or the like in combination with the rubber-like polymer in an amount up to 50% by weight based on the amount of the rubber-like polymer. Resins produced by these processes may be blended. In producing the target compositions, a polystyrene resin not containing a rubber-modified polystyrene resin produced by any of these processes may be incorporated. An example of the bulk polymerization process is carried out as follows. A rubber-like polymer (1–25 wt %) is dissolved in styrene monomer (99–75 wt %). In some cases, a solvent, a regulator, a polymerization initiator, and other additives are added. Polymerization is conducted to a styrene monomer conversion of 10 to 40% to convert the dissolved rubber-like polymer to dispersed particles. Until the formation of these rubber particles, the rubber is in the continuous phase. The polymerization is continued further through the phase change, i.e., the formation of dispersed rubber particles (step of particle formation), to a conversion of 50 to 99%. Thus, an impact-resistant polystyrene resin composition is produced.

The dispersed particles comprising a rubber-like polymer (rubber particles), in the present invention, are particles which are dispersed in the resin composition and consist of the rubber-like polymer and a polystyrene resin. The polystyrene resin has been graft-bonded to the rubber-like polymer or occluded therein without graft-bonding.

The diameter of the dispersed particles comprising a rubber-like polymer, in the present invention, is from 0.5 to 7.0 μm, preferably from 0.5 to 5.0 μm, more preferably from 1.0 to 4.0 μm, even more preferably from 1.0 to 3.0 μm, and most preferably from 1.0 to 2.0 μm. Especially for high-gloss grades, the diameter of the particles is preferably from 0.7 to 1.5 μm. Particle diameters outside that range are undesirable in that the object of the present invention cannot be attained.

Requirement (2) is then explained.

Requirement (2) is the rubber-like polymer which is a high-cis high-vinyl polybutadiene (HC-HV BR) comprising from 65 to 95% cis-1,4-structures and from 30 to 4% 1,2-structures. This constitution is preferred in accomplishing the object of the present invention.

The HC-HV BR can be obtained using a catalyst system comprising (a) a metallocene complex compound of a transition metal of Group V of the periodic table and (b) an ionic compound comprising a non-coordinating anion and a cation and/or an aluminoxane.

An explanation on Requirement (3) is given below.

Requirement (3) concerns β value which is a parameter indicating the distribution of 1,2-structures and 1,4-structures in the HC-HV BR chain in the present invention. The value of β is preferably in the range of 1.0<β≦1.43. The value of β for the HC-HV BR used in the present invention is defined by expression (A) given above, and is a parameter indicating the distribution of 1,2-structures and 1,4-structures in the polybutadiene. When β=1, then 1,2-structures and 1,4-structures are distributed perfectly randomly. When β>1, then diads each made up of a 1,2-structure and a 1,4-structure alternatively bonded to each other are present in a larger amount than in the perfectly random distribution. Conversely, when β<1, then the molecular chain contains sequences of a 1,2-structure and sequences of a 1,4-structure and these blocks are present in a larger amount than in the perfectly random distribution.

The value of β for the HC-HV BR in the present invention is in the range of preferably $1.0<\beta\leq1.43$, more preferably $1.0<\beta\leq1.25$. Namely, the proportion of diads each made up of a 1,2-structure and a 1,4-structure alternatively bonded to each other is preferably larger than in the perfectly random distribution. Because of this, the HC-HV BR for use in the present invention can bring about even higher effects than the conventionally known polybutadienes suitable for use in the production of impact-resistant polystyrene resin compositions.

The value of β for an HC-HV BR as prescribed in the present invention is determined by determining the content of 1,2-structures, that of cis-1,4-structures, that of trans-1,4-structures, and that of 1,2-structure/1,4-structure diads from a $^{13}$C-NMR spectrum of the polymer and calculating the value of β from the $P_{1,2}$, $P_{1,4}$, and $P_{1,2-1,4}$ using the following expression. For this procedure, reference may be made to the analytical method described in *Macromolecules*, 20, 2418 (1987).

$$\beta = P_{1,2-1,4}/(2\times P_{1,2}\times P_{1,4}) \quad (A)$$

In expression (A), $P_{1,2}$ represents the content of 1,2-structures, $P_{1,4}$ represents the content of 1,4-structures, and $P_{1,2-1,4}$ represents the content of 1,2-structure/1,4-structure diads in all diads.

Conditions for $^{13}$C-NMR spectrometry are as follows.

Apparatus: FT-NMR Type EX-400, manufactured by JEOL Ltd., Japan

Sample concentration: 10%; o-dichlorobenzene/$C_6D_6$ (4/1) solvent; 5 mmφ tube was used.

Observation width: 2 kHz

Internal reference: TMS

Temperature: 130° C.

Method of measurement: proton noise decoupling

Data point: 32k

Number of integrations: 5,000

Pulse repetition: 3 sec (45°)

An explanation on Requirement (4) is then given below.

The rubber-like HC-HV BR for use in the present invention is not particularly limited in molecular weight, degree of branching, or Mooney viscosity ($ML_{1+4}$). However, a 5 wt % styrene solution of the rubber-like polymer as measurement at 25° C. (5% SV) is preferably from 20 to 500 centipoises (cP), more preferably from 30 to 200 cP. If the 5% SV thereof is lower than 20 cP, not only the impact-resistant polystyrene resin composition obtained has poor impact resistance, but drying is difficult in producing the rubber-like polymer. Values of 5% SV exceeding 500 cP are industrially disadvantageous in that it is difficult to control the polymerization for producing an impact-resistant polystyrene resin composition because of the too high solution viscosity.

$ML_{1+4}$ is preferably a value which satisfies the following relationship between 5% SV and $ML_{1+4}$ (5% $SV/ML_{1+4}$).

$$2.0 \leq (5\% \, SV)/ML_{1+4} \leq 7.0 \quad (B)$$

Preferably, (5% SV)/$ML_{1+4}$ is from 3.0 to 6.0.

An explanation on Requirement (5) is given below.

Requirement (5) concerns the relationship between the tensile elongation (E) of the impact-resistant polystyrene resin composition and the dispersed-particle diameter ($X_1$) and amount ($X_2$) of the rubber-like polymer. The tensile elongation (E) of the impact-resistant polystyrene resin composition of the present invention is represented by the following expression (C).

$$E = -17.8X_1 + 5.6X_2 + 38.5 \quad (C)$$

The tensile elongation (E) of the impact-resistant polystyrene resin composition is preferably 20%<E<90%, more preferably 20%<E<80%. If the E of the composition is lower than 20%, impact resistance is considerably reduced. If the E thereof exceeds 90%, tensile strength is considerably reduced.

When the impact-resistant polystyrene resin composition of the present invention has an E in the range of from 20 to 90%, the composition is effective in mitigating the problem of poor elongation accompanying the conventional impact-resistant polystyrene resin compositions, in particular the problem that molded sheet articles obtained from the conventional compositions have considerably low tensile elongation at break. This is because the specific range of E is highly effective in enabling the composition of the present invention to have a good balance among impact resistance, tensile strength, and tensile elongation.

The tensile elongation (E) as prescribed in the present invention is determined by multiple regression analysis using multiple correlation with the dispersed-particle diameter, $X_1$, and amount, $X_2$, of the rubber-like polymer contained in the impact-resistant polystyrene resin composition, as follows. The value of the criterion variable E is estimated from the predictor variables $X_1$ and $X_2$ using the following multiple regression expression (C'), wherein the regression coefficients a, b, and c are determined from found data (Table 5) by the least-squares method. As a result, expression (C) is obtained.

$$E = aX_1 + bX_2 + c \quad (C')$$

$$E = -17.8X_1 + 5.6X_2 + 38.5 \quad (C)$$

Catalyst components for use in obtaining the rubber-like polymer are then explained.

For producing the HC-HV BR for use in the present invention, a catalyst system is used which comprises the following catalyst components: (a) a metallocene complex compound of a transition metal of Group V of the periodic table; and (b) an ionic compound comprising a non-coordinating anion and a cation and/or an aluminoxane.

The catalyst components for the present invention are explained in more detail.

Examples of the metallocene complex compound of a transition metal of Group V of the periodic table, as catalyst component (a), include compounds represented by the following general formulae.

| (1) $RMX_3$ | (2) $R_nMX_{3-n} \cdot L_a$ |
|---|---|
| (3) $RM(O)X_2$ | (4) $R_nMX_{3-n}(NR')$ |

In the above formulae, R is a cyclopentadienyl group, a substituted cyclopentadienyl group, an indenyl group, a substituted indenyl group, a silylcyclopentadienyl group, or a fluorenyl group; a is 0, 1, or 2; and n is 1 or 2.

M represents a transition metal compound of Group V of the periodic table. Examples thereof include vanadium (V), niobium (Nb), and tantalum (Ta). Vanadium is preferred.

X represents hydrogen, a halogen (e.g., fluorine, chlorine, bromine, or iodine), a hydrocarbon group having 1 to 20 carbon atoms (e.g., a linear or branched hydrocarbon group such as methyl, ethyl, n-propyl, isopropyl, n-butyl, isobutyl, sec-butyl, tert-butyl, or n-hexyl, an aromatic hydrocarbon group such as phenyl, tolyl, naphthyl, or benzyl, or a hydrocarbon group containing one or more silicon atoms, such as trimethylsilyl), an alkoxyl group (e.g., methoxyl, ethoxyl, phenoxyl, propoxyl, butoxyl, amyloxyl, hexyloxyl, octyloxyl, 2-ethylhexyloxyl, or thiomethoxyl), or an amino group (e.g., dimethylamino, diethylamino, or diisopropylamino). Preferred among the above examples of X are fluorine, chlorine, and bromine atoms, methyl, ethyl, butyl, methoxyl, ethoxyl, dimethylamino, diethylamino, and the like.

L is a Lewis base which is a general inorganic or organic compound having an electron pair and capable of coordinating to a metal. Especially preferred among such compounds are those containing no active hydrogen. Examples of the preferred compounds include tertiary amines such as pyridine, triethylamine, tributylamine, and dimethylaniline; alcohols such as methanol and ethanol; tertiary phosphines such as trimethylphosphine, triethylphosphine, tributylphosphine, and triphenylphosphine; ketones such as acetone, methyl ethyl ketone, and acetylacetone; N,N-dialkylamides such as N,N-dimethylformamide, N,N-dimethylacetamide, N,N-diethylformamide, and N,N-diethylacetamide; and ethers such as ethyl ether, butyl ether, isopropyl ether, benzyl ether, tetrahydrofuran, polyethylene glycol dimethyl ethers, anisole, and phenetole. Examples of L further include ester compounds and silyloxyl compounds.

NR' represents an imido group. R' represents a hydrocarbon group having 1 to 25 carbon atoms. Specific examples of R' include a methyl group, an ethyl group, a propyl group, an isopropyl group, a sec-butyl group, an isobutyl group, a tert-butyl group, a hexyl group, an octyl group, a neopentyl group, a phenyl group, a benzyl group, a methylphenylmethyl group, a dimethylphenylmethyl group, a naphthyl group, a 2,6-dimethylphenyl group, a 2,6-isopropyl group, and a 3,4-dimethylphenyl group.

Specific examples of the compound represented by general formula (1), $RMX_3$, are as follows.

(i) Cyclopentadienylvanadium trichloride is included in the examples. Monosubstituted cyclopentadienylvanadium trichlorides include methylcyclopentadienylvanadium trichloride, ethylcyclopentadienylvanadium trichloride, propylcyclopentadienylvanadium trichloride, isopropyl-cyclopentadienylvanadium trichloride, tert-butylcyclopentadienylvanadium trichloride, (1,1-dimethylpropyl) cyclopentadienylvanadium trichloride, (1,1-dimethylbenzyl)cyclopentadienylvanadium trichloride, (1-ethylpropyl)cyclopentadienylvanadium trichloride, (1-ethyl-1-methylpropyl)cyclopentadienylvanadium trichloride, (diethylbenzyl)cyclopentadienylvanadium trichloride, (trimethylsilylcyclopentadienyl)vanadium trichloride, and [bis(trimethylsilyl)cyclopentadienyl] vanadium trichloride.

Disubstituted cyclopentadienylvanadium trichlorides include (1,3-dimethylcyclopentadienyl)vanadium trichloride, (1-methyl-3-ethylcyclopentadienyl)vanadium trichloride, (1-methyl-3-propylcyclopentadienyl)vanadium trichloride, [1-methyl-3-bis(trimethylsilyl)cyclopentadieny] vanadium trichloride, 1-methyl-3-bis (trimethylsilylcyclopentadienyl)vanadium trichloride, (1-methyl-3-phenylcyclopentadienyl)vanadium trichloride, (1-methyl-3-tolylcyclopentadienyl)vanadium trichloride, [1-methyl-3-(2,6-dimethylphenyl)cyclopentadienyl] vanadium trichloride, and (1-methyl-3-butylcyclopentadienyl)vanadium trichloride.

Trisubstituted cyclopentadienylvanadium trichlorides include (1,2,3-trimethylcyclopentadienyl)vanadium trichloride and (1,2,4-trimethylcyclopentadienyl)vanadium trichloride.

Tetrasubstituted cyclopentadienylvanadium trichlorides include (1,2,3,4-tetramethylcyclopentadienyl)vanadium trichloride and (1,2,3,4-tetraphenylcyclopentadienyl) vanadium trichloride.

Pentasubstituted cyclopentadienylvanadium trichlorides include (pentamethylcyclopentadienyl)vanadium trichloride, (1,2,3,4-tetramethyl-5-phenylcyclopentadienyl) vanadium trichloride, and (1,2,3,4-tetraphenyl-5-methylcyclopentadienyl)vanadium trichloride.

(ii) Indenylvanadium trichloride is also included in the examples of the compound represented by general formula (1). Substituted indenylvanadium trichlorides include (2-methylindenyl)vanadium trichloride and (2-trimethylindenyl)vanadium trichloride.

(iii) Examples thereof further include monoalkoxides, dialkoxides, and trialkoxides obtained from the compounds enumerated under (i) and (ii) above by replacing one or more of the chlorine atoms with alkoxy groups. Such compounds include trimethylsilylcyclopentadienylvanadium tri-tert-butoxide, trimethylcyclopentadienylvanadium triisopropoxide, trimethylsilylcyclopentadienylvanadium dimethoxide chloride, trimethylsilylcyclopentadienylvanadium di-tert-butoxide chloride, trimethylsilylcyclopentadienylvanadium diphenoxide chloride, trimethylsilylcyclopentadienylvanadium diisopropoxide chloride, trimethylsilylcyclopentadienylvanadium tert-butoxide dichloride, and trimethylsilylcyclopentadienylvanadium phenoxide dichloride. Examples thereof furthermore include dimethylated compounds obtained from the above compounds by replacing the chlorine atoms with methyl groups; monoalkoxylated and dialkoxylated compounds obtained from these dimethylated compounds by replacing one or two chlorine atoms with one or two alkoxy groups; and compounds obtained by substituting the monochlorinated compounds with a methyl group.

(iv) Examples of the compound represented by general formula (1) furthermore include amides obtained from the compounds enumerated under (i) and (ii) above by replacing one or more chlorine atoms thereof with amido groups. Such compounds include (trimethylsilylcyclopentadienyl)(tris-diethylamido) vanadium, (trimethylcyclopentadienyl)(tris-isopropylamido)vanadium, (trimethylsilylcyclopentadienyl)(tris-n-octylamido) vanadium, (trimethylsilylcyclopentadienyl) (bisdiethylamido)vanadium chloride, (trimethylsilylcyclopentadienyl)(bisisopropylamido) vanadium chloride, (trimethylsilylcyclopentadienyl) (bis-n-octylamido)vanadium chloride, (trimethylsilylcyclopentadienyl)(diethylamido) vanadium dichloride, (trimethylsilylcyclopentadienyl) (isopropylamido)vanadium dichloride, and (trimethylsilylcyclopentadienyl)(n-octylamido) vanadium dichloride. Examples of the compound represented by general formula (1) furthermore include methylated compounds obtained from the above chlorides by replacing the chlorine atom(s) with methyl group(s).

Examples of the compound represented by general formula (1) furthermore include compounds in which R has one or more hydrocarbon and silyl groups bonded thereto. Such compounds include (tert-butyl)dimethylsilyl($\eta^5$-cyclopentadienyl)vanadium dichloride, (tert-butylamido) dimethylsilyl(trimethyl-$\eta^5$-cyclopentadienyl)vanadium dichloride, and (tert-butylamido)dimethylsilyl(tetramethyl- $\eta^5$-cyclopentadienyl)vanadium dichloride. Examples thereof furthermore include dimethylated compounds obtained from the above compounds by replacing the chlorine atoms with methyl groups; monoalkoxylated and dialkoxylated compounds obtained from these dimethylated compounds by replacing one or two chlorine atoms with one or two alkoxy groups; and compounds obtained by substituting the monochlorinated compounds with a methyl group.

Examples of the compound represented by general formula (1) furthermore include amides obtained from the compounds enumerated under (i) to (iv) above by replacing one or more chlorine atoms thereof with amido groups. Such compounds include (trimethylsilylcyclopentadienyl)(trisdiethylamido)vanadium, (trimethylsilylcyclopentadienyl)(tris-isopropylamido)vanadium, (trimethylsilylcyclopentadienyl)(tris-n-propylamido)vanadium, (trimethylsilylcyclopentadienyl)(tris-n-octylamido)vanadium, (trimethylsilylcyclopentadienyl)(bisdiethylamido)vanadium chloride, (trimethylsilylcyclopentadienyl)(bisisopropylamido) vanadium chloride, (trimethylsilylcyclopentadienyl)(bis-n-octylamido)vanadium chloride, (trimethylsilylcyclopentadienyl)(diethylamido)vanadium dichloride, (trimethylsilylcyclopentadienyl)(isopropylamido)vanadium dichloride, and (trimethylsilylcyclopentadienyl)(n-octylamido)vanadium dichloride. Examples of the compound represented by general formula (1) furthermore include methylated compounds obtained from the above chlorides by replacing the chlorine atom(s) with methyl group(s).

Specific examples of the compound represented by $RMX_2$ which is one form of general formula (2), $R_nMX_{3-n} \cdot L_a$, include dichlorides such as cyclopentadienylvanadium dichloride, methylcyclopentadienylvanadium dichloride, (1,3-dimethyl-cyclopentadienyl)vanadium dichloride, (1-methyl-3-butylcyclopentadienyl)vanadium dichloride, (pentamethylcyclopentadienyl)vanadium dichloride, (trimethylsilylcyclopentadienyl)vanadium dichloride, [1,3-di(trimethylsilyl)cyclopentadienyl]vanadium dichloride, indenylvanadium dichloride, (2-methylindenyl)vanadium dichloride, (2-methylsilylindenyl)vanadium dichloride, and fluorenylvanadium dichloride. Examples thereof also include dimethylated compounds obtained from the above compounds by replacing the chlorine atoms with methyl groups.

Examples thereof further include compounds represented by $RMX_2$ wherein R and X have one or more hydrocarbon and silyl groups bonded thereto. Such compounds include amido chlorides such as (t-butylamido)dimethylsilyl($\eta^5$-cyclopentadienyl)vanadium chloride and (t-butylamido)dimethylsilyl(tetramethyl-$\eta^5$-cyclopentadiethyl)vanadium chloride; and amides obtained from these compounds by replacing the chlorine atom with a methyl group.

Examples thereof furthermore include alkoxides such as cyclopentadienylvanadium dimethoxide, cyclopentadienylvanadium diisopropoxide, cyclopentadienylvanadium di-tert-butoxide, cyclopentadienyloxovanadium diphenoxide, cyclopentadienylvanadium methoxide chloride, cyclopentadienylvanadium isopropoxide chloride, cyclopentadienylvanadium tert-butoxide chloride, and cyclopentadienylvanadium phenoxide chloride. Examples thereof further include monomethylated compounds obtained from the above chlorides by replacing the chlorine atom with a methyl group.

Examples of the compound represented by $RMX_2$ furthermore include bisamides such as (cyclopentadienyl)(bisdiethylamido)vanadium, (cyclopentadienyl)(bisdiisopropylamido)vanadium, and (cyclopentadienyl)(bisdi-n-octylamido)vanadium.

Specific examples of the compound represented by $RMX_2 \cdot L_2$ which is another form of general formula (2), $R_nMX_{3-n} \cdot L_a$, include phosphine complexes such as a cyclopentadienylvanadium dichloride·bistrimethylphosphine complex, a cyclopentadienylvanadium dichloride·bistriethylphosphine complex, a (cyclopentadienyl)(bisdiisopropylamido) trimethylphosphine complex, and a monomethylcyclopentadienylvanadium dichloride·bistriethylphosphine complex.

Specific examples of the compound represented by $R_2MX_1 \cdot L_2$ which is still another form of general formula (2), $R_nMX_{3-n} \cdot L_a$, include chlorides such as dicyclopentadienylvanadium chloride, bis(methylcyclopentadienyl)vanadium chloride, bis(1,3-dimethylcyclopentadienyl)vanadium chloride, bis(1-methyl-3-butylcyclopentadienyl)vanadium chloride, bis(pentamethylcyclopentadienyl)vanadium chloride, bis(trimethylsilylcyclopentadienyl)vanadium chloride, bis[1,3-di(trimethylsilyl)cyclopentadienyl]vanadium chloride, diindenylvanadium dichloride, bis(2-methylindenyl)vanadium chloride, bis(2-methylsilylindenyl)vanadium chloride, and difluorenylvanadium chloride. Examples thereof also include methylated compounds obtained from the above compounds by replacing the chlorine atom(s) with methyl group(s).

Examples thereof furthermore include cyclopentadienylvanadium methoxide, dicyclopentadienylvanadium isopropoxide, dicyclopentadienylvanadium tert-butoxide, dicyclopentadienylvanadium phenoxide, dicyclopentadienyldiethylamidovanadium, dicyclopentadienyldiisopropylamidovanadium, and dicyclopentadienyldi-n-octylamidovanadium.

Examples of the compound represented by $R_2MX_1 \cdot L_2$ furthermore include compounds in which R has one or more hydrocarbon and silyl groups bonded thereto. Such compounds include chlorides such as dimethylbis($\eta^5$-cyclopentadienyl)silanevanadium chloride and dimethylbis(tetramethyl-$\eta^5$-cyclopentadienyl)silanevanadium chloride; and methylated compounds obtained from these compounds by replacing the chlorine atom with a methyl group.

Specific examples of the compound represented by general formula (3), $RM(O)X_2$, include cyclopentadienyloxovanadium dichloride, methylcyclopentadienyloxovanadium dichloride, (1,3-dimethylcyclopentadienyl)oxovanadium dichloride, (1-methyl-3-butylcyclopentadienyl)oxovanadium dichloride, (pentamethylcyclopentadienyl)oxovanadium dichloride, (trimethylsilylcyclopentadienyl)oxovanadium dichloride, [1,3-di(trimethylsilyl)cyclopentadienyl]oxovanadium dichloride, indenyloxovanadium dichloride, (2-methylindenyl)oxovanadium dichloride, (2-methylsilylindenyl)oxovanadium dichloride, and fluorenyloxovanadium dichloride. Examples thereof further include dimethylated compounds obtained from the above compounds by replacing the chlorine atoms with methyl groups.

Examples thereof furthermore include compounds in which R and X have one or more hydrocarbon and silyl groups bonded thereto. Such compounds include amido chlorides such as (t-butylamido)dimethylsilyl($\eta^5$-cyclopentadienyl)oxovanadium chloride and (t-butylamido)dimethylsilyl(tetramethyl-$\eta^5$-cyclopentadienyl)oxovanadium chloride; and amides obtained from these compounds by replacing the chlorine atom with a methyl group.

Examples of the compound represented by general formula (3) furthermore include cyclopentadienyloxovanadium dimethoxide, cyclopentadienyloxovanadium diisopropoxide, cyclopentadienyloxovanadium di-tert-butoxide, cyclopentadienyloxovanadium diphenoxide, cyclopentadienyloxovanadium methoxide chloride, cyclopentadienyloxovanadium isopropoxide chloride, cyclopentadienyloxovanadium tert-butoxide chloride, and cyclopentadienyloxovanadium phenoxide chloride. Examples thereof further include monomethylated compounds obtained from the above chlorides by replacing the chlorine atom with a methyl group.

Examples thereof furthermore include (cyclopentadienyl)(bisdiethylamido)oxovanadium, (cyclopentadienyl)(bisdiisopropylamido)oxovanadium, and (cyclopentadienyl)(bisdi-n-octylamido)oxovanadium.

Specific examples of the compound represented by general formula (4), $R_nMX_{3-n}(NR')$, include dichlorides such as cyclopentadienyl(methylimido)vanadium dichloride, cyclopentadienyl(phenylimido)vanadium dichloride, cyclopentadienyl(2,6-dimethylphenylimido)vanadium dichloride, cyclopentadienyl(2,6-diisopropylphenylimido)vanadium dichloride, (methylcyclopentadienyl)(phenylimido)vanadium dichloride, (methylpentamethylcyclopentadienyl)vanadium dichloride, [1,3-dimethylcyclopentadienyl(phenylimido)]vanadium dichloride, (1-methyl-3-butylcyclopentadienyl)(phenylimido)vanadium dichloride, (pentamethylcyclopentadienyl)(phenylimido)vanadium dichloride, indenyl(phenylimido)vanadium dichloride, 2-methylindenyl(phenylimido)vanadium dichloride, and fluorenyl(phenylimido)vanadium dichloride.

Examples thereof further include compounds in which R and X have one or more hydrocarbon and silyl groups bonded thereto. Such compounds include amido chlorides such as (t-butylamido)dimethylsilyl($\eta^5$-cyclopentadienyl)(phenylimido)vanadium chloride and (t-butylamido)dimethylsilyl(tetramethyl-$\eta^5$-cyclopentadienyl)(phenylimido)vanadium chloride; and amides obtained from these compounds by replacing the chlorine atom with a methyl group.

Examples of the compound represented by general formula (4) furthermore include compounds in which R has one or more hydrocarbon and silyl groups bonded thereto. Such compounds include amido chlorides such as dimethylbis($\eta^5$cyclopentadienyl)silane(phenylimido)vanadium chloride, dimethylbis($\eta^5$-cyclopentadienyl)silane(tolylimido)vanadium chloride, dimethyl(tetramethyl-$\eta^5$-cyclopentadienyl)silane(phenylimido)vanadium chloride, dimethyl(tetramethyl-$\eta^5$-cyclopentadienyl)silane(tolylimido)vanadium chloride; and amides obtained from these compound by replacing the chlorine atom with a methyl group.

Examples thereof furthermore include cyclopentadienylvanadium (phenylimide) dimethoxide, cyclopentadienyloxovanadium (phenylimide) diisopropoxide, cyclopentadienylvanadium (phenylimide) (isopropoxide) chloride, (cyclopentadienyl)(bisdiethylamido)vanadium (phenylimide), (cyclopentadienyl)(bisisopropylamido)vanadium (phenylimide).

The ionic compound which can be used as component (b) for the present invention comprises a non-coordinating anion and a cation. Examples of the non-coordinating anion include tetra(phenyl) borate, tetra(fluorophenyl) borate, tetrakis(difluorophenyl) borate, tetrakis(trifluorophenyl) borate, tetrakis(tetrafluorophenyl) borate, tetrakis(pentafluorophenyl) borate, tetrakis(tetramethylfluorophenyl) borate, tetra(tolyl) borate, tetra(xylyl) borate, (triphenyl, pentafluorophenyl) borate, [tris(pentafluorophenyl)phenyl] borate, tridecahydride-7,8-dicarbaundecaborate, and tetrafluoroborates.

On the other hand, examples of the cation include carbonium cations, oxonium cations, ammonium cations, phosphonium cations, cycloheptyltrienyl cations, and ferrocenium cations having a transition metal.

Examples of the carbonium cations include tri-substituted carbonium cations such as triphenylcarbonium and tri(substituted phenyl)carboniums. Specific examples of the tri(substituted phenyl)carbonium cations include tri(methylphenyl)carbonium and tri(dimethylphenyl)carbonium.

Examples of the ammonium cations include trialkylammonium cations such as trimethylammonium, triethylammonium, tripropylammonium, and tributylammonium and dialkylammonium cations such as N,N-2,4,6-pentamethylammonium, di(isopropyl)ammonium, and dicyclohexylammonium.

Examples of the phosphonium cations include triarylphosphonium cations such as triphenylphosphonium, tri(methylphenyl)phosphonium, and tri(dimethylphenyl)phosphonium.

A combination of any of the aforementioned non-coordinating anions with any of the aforementioned cations can be advantageously used as the ionic compound. Especially preferred examples of the ionic compound include trityl tetra(pentafluorophenyl) borate, triphenylcarbonium tetra(fluorophenyl) borate, N,N-dimethylanilinium tetra(pentafluorophenyl) borate, and 1,1'-dimethylferrocenium tetra(pentafluorophenyl) borate. Such ionic compounds may be used either alone or in combination of two or more thereof.

An aluminoxane may be used as component (b) for the present invention. Examples of the aluminoxane include linear and cyclic compounds represented by the following general formulae (wherein R" represents a hydrocarbon group having 1 to 10 carbon atoms, and n, indicating the degree of polymerization, represents an integer of 2 or larger, provided that the groups of R" have been partly replaced with one or more halogen atoms and/or one or more alkoxyl groups). In particular, methyl aluminoxanes which are represented by the following general formulae wherein R" is methyl and n is 5 or larger, preferably 10 or larger, are utilized. Those aluminoxanes may contain a slight amount of alkylaluminum compounds.

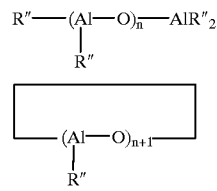

For the present invention, use may be made of a catalyst system comprising a combination of component (a), component (b), and an organic compound of a metal of Groups I to III of the periodic table, as component (c). The addition of component (c) improves activity in polymerization. Examples of the organic compound of a metal of Groups I to III of the periodic table include organoaluminum compounds, organolithium compounds, organomagnesium compounds, organozinc compounds, and organoboron compounds. Examples thereof further include halides and hydrides of these organometallic compounds. Two or more such organometallic compounds can be used in combination.

Specific examples of component (c) include trimethylaluminum, dimethylaluminum chloride, triethylaluminum, sesquiethylaluminum chloride, diethylaluminum chloride, sesquiethylaluminum hydride, diethylaluminum hydride, triisobutylaluminum, trihexylaluminum, trioctylaluminum, tridecylaluminum, methyllithium, butyllithium, phenyllithium, benzyllithium, neopentyllithium, trimethylsilylmethyllithium, bistrimethylsilylmethyllithium, dibutylmagnesium, butylmagnesium chloride, dihexylmagnesium, ethylmagnesium chloride, diethylzinc, dimethylzinc, boron trifluoride, and triphenylboron.

Examples thereof further include organometallic halides such as ethylmagnesium chloride, butylmagnesium chloride, dimethylaluminum chloride, diethylaluminum chloride, sesquiethylaluminum chloride, and ethylaluminum dichloride and organometallic hydrides such as diethylaluminum hydride and sesquiethylaluminum hydride. Two or more such organometallic compounds can be used in combination.

In the case where an ionic compound is used as component (b), the aluminoxane described hereinabove may be used as component (c) in combination therewith.

The proportions of the catalyst components vary depending on various conditions. However, the molar ratio of the metallocene complex of component (a) to the aluminoxane of component (b) is preferably from 1:1 to 1:10,000, more preferably from 1:1 to 1:5,000.

The molar ratio of the metallocene complex of component (a) to the ionic compound of component (b) is preferably from 1:0.1 to 1:10, more preferably from 1:0.2 to 1:5.

The molar ratio of the metallocene complex of component (a) to the organometallic compound of component (c) is preferably from 1:0.1 to 1:1,000, more preferably from 1:0.2 to 1:500.

Although the sequence of the addition of catalyst components is not particularly limited, the catalyst components can be added, for example, in the following orders.

(1) A metallocene complex is added to a mixture of a monomer to be polymerized and component (b).

(2) A metallocene complex is added to a mixture prepared by adding components (b) and (c) in any order to a monomer to be polymerized.

(3) Component (b) is added to a mixture of a monomer to be polymerized and component (c), and a metallocene complex is then added thereto.

(4) A mixture obtained by contacting a metallocene complex with component (b) in any order is added to a monomer to be polymerized.

Use of hydrogen as a regulator is economical in producing an HC-HV BR. Methods for polymerization are not particularly limited, and bulk polymerization, solution polymerization, or another polymerization method may be suitably used according to purposes. A solvent suitably selected according to purposes from aliphatic hydrocarbons, aromatic hydrocarbons, and halogenated hydrocarbons derived from these may be used. A combination of two or more of such compounds may also be used.

A process for producing an impact-resistant polystyrene resin composition from the thus-obtained HC-HV BR and a styrene monomer is explained below. Either a batch or a continuous process may be used without particular limitations, as long as it does not defeat the object of the invention.

Examples of the styrene monomer include those conventionally known to be used for producing impact-resistant polystyrene resin compositions, such as styrene, alkyl-substituted styrenes, e.g., α-methylstyrene and p-methylstyrene, and halogen-substituted styrenes such as chlorostyrene. These styrene monomers are used alone or as a mixture of two or more thereof. Preferred of those is styrene.

Examples of the rubber-like polymer include butadiene rubbers, styrene/butadiene rubbers, isoprene/butadiene rubbers, nitrile/butadiene rubbers, and the like each having an HC-HV BR structure obtained with the catalyst system described above comprising (a) a metallocene complex compound of a transition metal of Group V of the periodic table and (b) an ionic compound comprising a non-coordinating anion and a cation and/or an aluminoxane. Preferred are the butadiene rubbers.

In the present invention, a feedstock solution consisting mainly of the styrene monomer and the rubber-like polymer is polymerized in a perfect-mixing reactor. Although any perfect-mixing reactor in which the feedstock solution is kept in a perfectly mixed state may be used, preferred ones have agitating blades of the helical ribbon, double-helical ribbon, or anchor type or the like. In the case of a helical ribbon type agitating blade, it is preferred to provide the reactor with a draft tube to further enhance vertical circulation within the reactor.

Known additives may be suitably added to the impact-resistant polystyrene resin compositions of the present invention if desired and necessary, during or after the production of the compositions. Examples of the additives include stabilizers such as antioxidants and ultraviolet absorbers, release agents, lubricants, colorants, various fillers, various plasticizers, higher fatty acids, organic polysiloxanes, silicone oils, flame retardants, antistatic agents, and foaming agents.

The impact-resistant polystyrene resin compositions of the present invention can be used as various molded articles. Since the impact-resistant polystyrene resin compositions give molded articles having significantly improved tensile elongation and excellent impact and tensile strength, the applications thereof are not limited to molded sheet articles and the like. Namely, various molded articles can be obtained therefrom by known molding techniques such as injection molding, single-screw extrusion molding, biaxially-stretching extrusion molding, inflation extrusion molding, vacuum forming, and blow molding. For example, the compositions can be used in a wide range of applications such as packaging and sundry applications, e.g., ice cream cups and trays, and parts of domestic electrical appliances or industrial parts, e.g., the housings of color TV's, combination tape recorder and radios, word processors, typewriters, facsimiles, VTR cassettes, and telephones. The impact-resistant polystyrene resin compositions are also usable in automotive tire applications and in nontire applications such as golf balls and shoe soles. For example, the compositions can be used as parts of domestic electrical appliances, parts of OA apparatuses, food containers, and packaging containers.

The present invention will be explained below in more detail by reference to Reference Examples, Examples, and Comparative Examples. However, the invention should not be construed as being limited by these, as long as care is taken to satisfy the requirements of the present invention.

In the Reference Examples, Examples, and Comparative Examples, the following methods were used for determining the Mooney viscosity, molecular weight and molecular weight distribution, microstructure, and styrene solution viscosity of each rubber-like polymer obtained, and for examining each impact-resistant polystyrene resin composition for the content of a rubber-like polymer, grafting percentage, degree of swelling, rubber particle diameter, Izod and Du Pont impact strengths, tensile properties, and gloss.

Mooney viscosity: The Mooney viscosity $ML_{1+4}$ (100° C.) of a rubber was measured in accordance with JIS K6300.

Molecular weight and molecular weight t distribution: Weight-average molecular weight, $M_w$, and number-average molecular weight, $M_n$, were calculated using a calibration curve determined from a molecular weight distribution curve obtained by gel permeation chromatography (GPC) using polystyrene as a standard substance. The $M_w$ and $M_n$ are shown together with $M_w/M_n$ as a measure of the width of molecular weight distribution.

Microstructure: Microstructure was calculated from the molecular extinction coefficients for cis-1,4-structures (740 cm$^{-1}$), vinyl structures (911 cm$^{-1}$), and trans-1,4-structures (967 cm$^{-1}$) determined by infrared absorption spectrometry using the Hampton method.

Glass transition temperature ($T_g$): A sample was heated from –150° C. to 0° C. at a rate of 10° C./min using a differential scanning calorimeter (DSC) to measure the glass transition temperature.

Styrene solution viscosity: Five grams of a rubber-like polymer was dissolved in 95 g of styrene monomer. The viscosity of the solution as measured at 25° C. (5% SV) is shown in terms of centipoises (cP).

Content of rubber-like polymer: Using pyrolytic gas chromatography, 0.5 g of an impact-resistant polystyrene resin composition was pyrolyzed at 590° C., and the gas generated was analyzed with a flame ionization detector. The ratio of the peak area for butadiene to that for styrene was determined and compared with a calibration curve obtained beforehand to determine the content of a rubber-like polymer.

Grafting percentage: One gram of an impact-resistant polystyrene resin composition was added to 50 ml of a methyl ethyl ketone/acetone=1/1 (by weight) mixed solvent. This mixture was vigorously shaken for 1 hour to dissolve or swell the composition. Subsequently, the resultant mixture was treated with a centrifugal separator to precipitate the insoluble matter, and the supernatant was removed by decantation. The thus-obtained matter insoluble in methyl ethyl ketone/acetone was vacuum-dried at 50° C., cooled in a desiccator, and then weighed. Thus, the amount of the matter insoluble in methyl ethyl ketone/acetone (MEK/AC-insol., g) was determined. The grafting percentage was calculated using the following equation from the MEK/AC-insol. and the rubber-like-polymer amount (R, g) calculated from the rubber-like-polymer content.

Grafting percentage=[MEK/AC-insol. (g)–R (g)]×100/R (g)

Degree of swelling: One gram of an impact-resistant polystyrene resin composition was added to 50 ml of toluene. This mixture was vigorously shaken for 1 hour and then centrifuged to precipitate the insoluble matter. The supernatant was removed by decantation. The weight of the precipitated part (weight of the swollen undried part) was measured. Thereafter, the precipitated part was vacuum-dried at 100° C., cooled in a desiccator, and then weighed. The degree of swelling is shown in terms of the ratio of swollen-state weight/dry-state weight.

Rubber particle diameter: An impact-resistant polystyrene resin composition was added to dimethylformamide to dissolve only the polystyrene part constituting the matrix. Part of the resultant solution was dispersed in an electrolytic solution consisting of dimethylformamide as a solvent and ammonium thiocyanate as a dispersing agent. The dispersion was examined with Coulter counter Type TA-2, manufactured by Japan Scientific Instrument Co., Ltd., Japan. The volume-average particle diameter thus obtained was taken as the rubber particle diameter.

Tensile Properties: Yield point strength, breaking strength, and elongation were measured in accordance with JIS K7113.

Izod impact strength: Measurement was made in accordance with JIS K7110 (with notch).

Du Pont impact strength: The strength is shown in terms of 50% breaking energy determined with a Du Pont drop impact tester.

Gloss: Gloss was measured in accordance with JIS Z8742 (angle of incidence, 60°).

REFERENCE EXAMPLE 1

The atmosphere in a 5-l autoclave equipped with a stirrer was replaced with nitrogen. Into this autoclave was introduced 3.5 l of a toluene solution containing 30 wt % 1,3-butadiene (1,3-butadiene: 814 g). Subsequently, hydrogen gas was introduced thereinto to heighten the pressure by the value shown in Table 1. At 30° C., 2.25 mmol of triethylaluminum was added over a period of 3 minutes, followed successively by 0.066 mmol of trityl tetra (perfluorophenyl) borate and 0.044 mmol of cyclopentadienylvanadium trichloride. The monomer was polymerized at 40° C. for 30 minutes. The polymerization conditions used are shown in Table 1. The contents of diads and the value of β, which is a parameter indicating the distribution of 1,2-structures and 1,4-structures, both calculated from a $^{13}$C-NMR spectrum of the thus-obtained polybutadiene are shown in Table 2. The results of the polymerization are shown in Table 3.

REFERENCE EXAMPLE 2

Polymerization was conducted in the same manner as in Reference Example 1, except that the amounts of the catalyst components and hydrogen gas were changed as shown in Table 1. The results obtained are shown in Tables 2 and 3.

REFERENCE EXAMPLES 3 AND 4

Using an 8-l autoclave, polymerization was conducted in the same manner as in Reference Example 1, except that 5 l of a toluene solution containing 20 wt % 1,3-butadiene (1,3-butadiene: 814 g) was used, and that the amounts of the catalyst components and hydrogen gas were changed as shown in Table 1. The results obtained are shown in Tables 2 and 3.

TABLE 1

| Reference Example | BD wt % | TEA mmol | Polymerization Conditions Ph$_3$CB(C$_6$F$_5$)$_4$ mmol | CpVCl$_3$ mmol | H$_2$ kgG/cm$^2$ | Temp. ° C. | Time min |
|---|---|---|---|---|---|---|---|
| 1 | 30 | 2.25 | 0.066 | 0.044 | 0.70 | 40 | 30 |
| 2 | 30 | 2.25 | 0.053 | 0.035 | 0.55 | 40 | 23 |
| 3 | 20 | 2.25 | 0.045 | 0.030 | 0.20 | 40 | 60 |
| 4 | 20 | 2.25 | 0.033 | 0.022 | 0.09 | 40 | 60 |

TABLE 2

| Microstructure and Diad Structure by $^{13}$C-NMR | Reference Example | | | |
|---|---|---|---|---|
| | 1 | 2 | 3 | 4 |
| Microstructure (%) | | | | |
| cis-1,4 | 86.1 | 86.8 | 87.6 | 86.0 |
| trans-1,4 | 1.9 | 2.0 | 1.9 | 2.0 |
| 1,2 | 12.0 | 11.2 | 10.5 | 12.0 |
| Diad (%) | | | | |
| cis-1,4/1,2 | 11.0 | 10.4 | 9.8 | 11.1 |
| 1,2-/cis-1,4 | 10.0 | 9.6 | 9.1 | 10.0 |
| trans-1,4/1,2 | 0 | 0 | 0 | 0 |
| 1,2/trans-1,4 | 0.9 | 0.8 | 0.8 | 0.8 |
| cis-1,4/1,4 | 75.2 | 76.5 | 77.9 | 75.1 |
| trans-1,4/1,4 | 1.9 | 1.9 | 2.0 | 2.1 |
| 1,2/1,2 | 1.0 | 0.8 | 1.0 | 1.0 |
| Content of structure (%) | | | | |
| $P_{1,2}$ | 0.120 | 0.112 | 0.105 | 0.120 |
| $P_{1,4}$ | 0.880 | 0.888 | 0.895 | 0.880 |
| $P_{1,2-1,4}$ | 0.219 | 0.208 | 0.197 | 0.219 |
| Distribution Parameter $\beta$ | 1.04 | 1.05 | 1.05 | 1.04 |

TABLE 3

| | | | | | Results of Polymerization | | | | | | |
|---|---|---|---|---|---|---|---|---|---|---|---|
| Reference Example | Conv. % | Microstructure, % | | | GPC | | | 5% SV | | | Tg |
| | | cis | trans | vinyl | $M_w \times 10^{-5}$ | $M_n \times 10^{-5}$ | $M_w/M_n$ | cP | $ML_{1+4}$ | 5% $SV/ML_{1+4}$ | °C. |
| 1 | 53 | 88.8 | 1.6 | 9.6 | 3.58 | 1.08 | 3.32 | 52 | 13 | 4.0 | −100.4 |
| 2 | 47 | 88.8 | 1.6 | 9.5 | 4.10 | 1.32 | 3.10 | 78 | 20 | 3.9 | −100.5 |
| 3 | 47 | 89.0 | 1.8 | 9.2 | 2.90 | 1.33 | 2.18 | 33 | 10 | 3.3 | −100.7 |
| 4 | 29 | 88.7 | 1.6 | 9.6 | 4.76 | 1.97 | 2.42 | 153 | 37 | 4.1 | −100.4 |
| 5[a] | | 95.8 | 1.8 | 2.4 | 4.31 | 1.25 | 3.5 | 41 | 29 | 1.4 | −107.1 |
| 6[b] | | 96.9 | 1.3 | 1.8 | 4.84 | 1.34 | 3.6 | 62 | 39 | 1.6 | −107.4 |
| 7[c] | | 33.9 | 55.4 | 10.7 | 3.63 | 1.66 | 2.2 | 84 | 34 | 2.5 | −93.4 |
| 8[d] | | 35.2 | 55.7 | 9.1 | 4.56 | 1.88 | 2.4 | 166 | 52 | 3.2 | −93.8 |

[a]high-cis BR
[b]high-cis BR
[c]low-cis BR
[d]low-cis BR

EXAMPLES 1 TO 4—4

The atmosphere in a 1.5-1 autoclave equipped with a stirrer was replaced with nitrogen gas. Into this autoclave were introduced 465 g of styrene and 35 g of the HC-HV BR (7 parts by weight of the rubber) produced in each of Reference Examples 1 to 4 under the conditions shown in Table 1. After the HC-HV BR was dissolved in the styrene, 0.15 g of n-dodecyl mercaptan was added thereto, and the monomer was preliminarily polymerized at 135° C. with stirring under the conditions shown in Table 4 until the styrene conversion reached 30%, which took 1.5 hours. To the resultant reaction mixture was then added 500 ml of a 0.5 wt % aqueous poly(vinyl alcohol) solution, followed by 1.0 g (0.2 part by weight) of benzoyl peroxide and 1.0 g (0.2 part by weight) of dicumyl peroxide. Polymerization was further conducted continuously first at 100° C. for 2 hours, subsequently at 125° C. for 3 hours, and then at 140° C. for 2 hours. Thereafter, the reaction mixture was cooled to room temperature, and the resultant polymer in the form of beads was taken out of the mixture by filtration, washed with water, dried, and then pelleted with an extruder. Thus, impact-resistant polystyrene resin compositions were obtained each in an amount of 450 g. The impact-resistant polystyrene resin compositions obtained were injection-molded into test pieces, which were examined for the properties shown in Table 4. The results obtained are given in Table 4.

COMPARATIVE EXAMPLES 1—1 To 4

Impact-resistant polystyrene resin compositions were produced by conducting polymerization in the same manner as in Examples 1 to 4—4, except that each of the BR's of Reference Examples 5 to 8 shown in Table 3 was used, and that the speed of stirring for the preliminary polymerization was changed. The compositions obtained were injection-molded into test pieces, which were examined for the properties shown above. The results obtained are given in Table 4.

TABLE 4

| | Preliminary Polymerization, Stirring speed rpm | Results of Property Examination | | | | | | |
|---|---|---|---|---|---|---|---|---|
| | | Rubber content wt % | Rubber particle diameter μm | Grafting percentage wt % | Degree of swelling | Impact Strength | | Gloss % |
| | | | | | | Izod kg · cm/cm | Du Pont kg · cm | |
| Example | | | | | | | | |
| 1 | 500 | 7 | 1.86 | 238 | 11.4 | 9.8 | 39.2 | 76 |
| 2 | 500 | 7 | 2.34 | 262 | 10.9 | 8.9 | 38.1 | 63 |
| 3-1 | 500 | 7 | 1.30 | 226 | 12.1 | 10.1 | 39.6 | 80 |
| 3-2 | 600 | 7 | 1.02 | 216 | 12.3 | 10.3 | 40.3 | 90 |
| 4-1 | 800 | 15 | 1.25 | 241 | 11.4 | 12.5 | 41.1 | 89 |
| 4-2 | 500 | 7 | 2.97 | 271 | 10.4 | 8.1 | 37.8 | 58 |
| 4-3 | 700 | 7 | 1.13 | 223 | 11.8 | 10.5 | 39.9 | 91 |
| 4-4 | 500 | 5 | 1.26 | 209 | 12.5 | 9.3 | 34.1 | 92 |
| Comparative Example | | | | | | | | |
| 1-1 | 550 | 7 | 1.85 | 218 | 10.8 | 10.2 | 37.4 | 69 |
| 1-2 | 700 | 7 | 1.11 | 164 | 11.4 | 10.7 | 37.7 | 83 |
| 2 | 550 | 7 | 2.35 | 228 | 10.8 | 9.4 | 36.5 | 62 |
| 3-1 | 500 | 7 | 2.36 | 274 | 9.7 | 8.1 | 39.6 | 59 |
| 3-2 | 700 | 7 | 1.10 | 252 | 9.3 | 9.2 | 40.2 | 82 |
| 4 | 600 | 7 | 3.01 | 280 | 10.0 | 7.3 | 37.7 | 54 |

Comparative Examples 1—1 to 4 correspond to Reference Examples 5 to 8 as follows.

| Comparative Example | | Reference Example |
|---|---|---|
| 1-1, 1-2 | → | 5 |
| 2 | → | 6 |
| 3-1, 3-2 | → | 7 |
| 4 | → | 8 |

EXAMPLES 5 TO 8

The atmosphere in a 1.5-l autoclave equipped with a stirrer was replaced with nitrogen gas. Into this autoclave were introduced 475 g of styrene and 25 g of the HC-HV BR (the total amount of the styrene and the rubber, 500 g; rubber, 5 wt %) produced in each of Reference Examples 1 to 4 under the conditions shown in Table 1. After the HC-HV BR was dissolved in the styrene, 0.10 g of n-dodecyl mercaptan was added thereto, and the monomer was preliminarily polymerized at 135° C. with stirring under the conditions (400 rpm) shown in Table 5 until the styrene conversion reached 30%, which took 1.5 hours. To the resultant reaction mixture was then added 500 ml of a 0.5 wt % aqueous polyvinyl alcohol) solution, followed by 1.0 g (0.2 part by weight) of benzoyl peroxide and 1.0 g (0.2 part by weight) of dicumyl peroxide. Polymerization was further conducted continuously first at 100° C. for 2 hours, subsequently at 125° C. for 3 hours, and then at 140° C. for 2 hours. Thereafter, the reaction mixture was cooled to room temperature, and the resultant polymer in the form of beads was taken out of the mixture by filtration, washed with water, dried, and then pelleted with an extruder. Thus, impact-resistant polystyrene resin compositions were obtained each in an amount of 450 g. The impact-resistant polystyrene resin compositions obtained were injection-molded into test pieces, which were examined for the properties shown in Table 5. The results obtained are given in Table 5.

EXAMPLES 9, 11 AND 13

The same procedure as in Examples 5 to 8 was conducted, except that styrene was used in combination with the HC-HV BR produced in Reference Example 1 shown in Table 3, and that the conditions were changed as shown in Table 5. The impact-resistant polystyrene resin compositions obtained were injection-molded into test pieces, which were examined for properties. The results obtained are shown in Table 5.

EXAMPLES 10, 12 AND 14

The same procedure as in Examples 5 to 8 was conducted, except that styrene was used in combination with the HC-HV BR produced in Reference Example 2 shown in Table 3, and that the conditions were changed as shown in Table 5. The impact-resistant polystyrene resin compositions obtained were injection-molded into test pieces, which were examined for properties. The results obtained are shown in Table 5.

COMPARATIVE EXAMPLES 5 TO 7

Polymerization was conducted in the same manner as in Examples 5 to 8, except that each of the BR's of Reference Examples 5 to 7 shown in Table 3 was used, and that the conditions shown in Table 5 were used. The impact-resistant polystyrene resin compositions obtained were injection-molded into test pieces, which were examined for properties. The results obtained are shown in Table 5.

COMPARATIVE EXAMPLES 8 TO 10

Polymerization was conducted in the same manner as in Examples 5 to 8, except that each of the BR's of Reference Examples 5 to 7 shown in Table 3 was used, and that the conditions shown in Table 5 were used. The impact-resistant polystyrene resin compositions obtained were injection-molded into test pieces, which were examined for properties. The results obtained are shown in Table 5.

Since the HC-HV BR used for the present invention is a high-cis high-vinyl polybutadiene comprising from 65 to 95% cis-1,4-structures and from 30 to 4% vinyl structures, it has the same reactivity with styrene monomer as low-cis BR's due to the high vinyl structure content. The impact-resistant polystyrene resin compositions obtained using this HC-HV BR are rubber-modified impact-resistant polystyrene resin compositions which combine desirable properties of the conventional impact-resistant polystyrene resins modified with a high-cis BR and desirable properties of those modified with a low-cis BR, that is, which are excellent in all of gloss, surface impact resistance, low-temperature properties, tensile strength, tensile elongation, and the like.

While the invention has been described in detail and with reference to specific embodiments thereof, it will be apparent to one skilled in the art that various changes and modifications can be made therein without departing from the spirit and scope thereof.

What is claimed is:

1. A rubber-modified impact-resistant polystyrene resin composition containing dispersed particles comprising a rubber polymer, said composition satisfying the following:

(1) the content of the rubber polymer in the composition is from 1 to 25% by weight;

(2) the rubber polymer is a high-cis high-vinyl polybutadiene comprising from 65 to 95% cis-1,4-structures and from 30 to 4% 1,2-structures; and (3) the relationship between the 1,4-structures and 1,2-structures of the rubber polymer is represented by the following expression (A), wherein the value of $\beta$ is in the range of $1.0 < \beta \leq 1.43$:

$$\beta = P_{1,2\text{-}1,4}/(2 \times P_{1,2} \times P_{1,4}) \tag{A}$$

wherein $P_{1,2}$ represents the content of 1,2-structures, $P_{1,4}$ represents the content of 1,4-structures, and $P_{1,2\text{-}1,4}$ represents the content of 1,2-structure/1,4-structure diads in all diads; and (6) the high-cis high-vinyl polybutadiene is a polybutadiene obtained using a catalyst system comprising:

TABLE 5

|  | Preliminary Polymerization, Stirring speed rpm | Rubber content wt % | Rubber particle diameter μm | Results of Property Examination | | | Tensile Strength | | |
|---|---|---|---|---|---|---|---|---|---|
|  |  |  |  | Impact Strength | | Yield point MPa | Breaking point MPa | Elongation % |
|  |  |  |  | Izod kg · cm/cm | DuPont kg · cm |  |  |  |
| Example |  |  |  |  |  |  |  |  |
| 5 | 400 | 5 | 1.22 | 9.1 | 30.1 | 34.7 | 34.5 | 45 |
| 6 | 400 | 5 | 1.41 | 8.7 | 29.5 | 33.5 | 33.1 | 42 |
| 7 | 400 | 5 | 1.01 | 9.5 | 30.7 | 34.3 | 34.3 | 49 |
| 8 | 400 | 5 | 1.97 | 8.3 | 28.4 | 33.8 | 33.6 | 32 |
| 9 | 450 | 7 | 1.82 | 9.9 | 39.2 | 32.4 | 31.7 | 44 |
| 10 | 450 | 7 | 2.33 | 9.0 | 38.0 | 30.3 | 30.5 | 37 |
| 11 | 600 | 10 | 2.31 | 10.3 | 41.6 | 27.6 | 27.1 | 55 |
| 12 | 600 | 10 | 2.78 | 9.7 | 40.3 | 26.7 | 26.7 | 43 |
| 13 | 700 | 13 | 2.69 | 10.2 | 42.1 | 26.1 | 25.8 | 63 |
| 14 | 700 | 13 | 3.52 | 9.3 | 39.2 | 25.1 | 24.9 | 50 |
| Comparative Example |  |  |  |  |  |  |  |  |
| 5 | 500 | 7 | 1.84 | 10.5 | 37.5 | 32.1 | 31.3 | 31 |
| 6 | 500 | 7 | 2.31 | 9.5 | 36.5 | 31.4 | 31.0 | 26 |
| 7 | 450 | 7 | 2.32 | 8.3 | 39.9 | 31.4 | 30.9 | 24 |
| 8 | 500 | 5 | 1.12 | 9.6 | 28.6 | 33.9 | 33.8 | 19 |
| 9 | 600 | 10 | 2.91 | 9.9 | 38.8 | 26.7 | 26.6 | 40 |
| 10 | 700 | 13 | 3.47 | 8.3 | 39.3 | 25.3 | 25.1 | 37 |

(a) a metallocene complex compound of a transition metal of Group V of the periodic table; and (b) (i) an ionic compound comprising a non-coordinating anion and a cation, and/or (ii) an aluminoxane.

2. The rubber-modified impact-resistant polystyrene resin composition as claimed in claim 1, said composition satisfying the following:

(4) the relationship between the viscosity of a 5% styrene solution of the rubber polymer as measurement at 25° C. (5% SV) and the Mooney viscosity ($ML_{1+4}$) of the polymer satisfies the following expression (B):

$$2.0 \leq (5\% \ SV)/ML_{1+4} \leq 7.0 \qquad (B).$$

3. A rubber-modified impact-resistant polystyrene resin composition containing dispersed particles comprising a rubber polymer, said composition satisfying the following:

(1) the content of the rubber-like polymer in the composition is from 3 to 15% by weight;

(2) the rubber polymer is a high-cis high-vinyl polybutadiene comprising from 65 to 95% cis-1,4-structures and from 30 to 4% 1,2-structures; and (5) the relationship between the tensile elongation of the rubber-modified impact-resistant polystyrene resin composition and the dispersed-particle diameter and amount of the rubber polymer is represented by the following expression (C), the value of E is in the range of 20%<E<90%:

$$E = -17.8X_1 + 5.6X_2 + 38.5 \qquad (C)$$

wherein E represents the tensile elongation (%), $X_1$ represents the dispersed-particle diameter ($\mu$m) of the rubber polymer, and $X_2$ represents the amount (wt %) of the rubber polymer.

4. The rubber-modified impact-resistant polystyrene resin composition as claimed in claim 3, wherein the value of E is in the range of 20%<E<80%.

* * * * *